United States Patent [19]

Aleman R.

[11] Patent Number: 5,256,847
[45] Date of Patent: Oct. 26, 1993

[54] TIG SHIELDED ATMOSPHERE WELDING SYSTEM

[75] Inventor: Miguel A. Aleman R., Caracas, Venezuela

[73] Assignee: Intevep, S.A., Caracas, Venezuela

[21] Appl. No.: 928,288

[22] Filed: Aug. 12, 1992

[51] Int. Cl.$^5$ .............................................. B23K 9/16
[52] U.S. Cl. ....................................... 219/74; 219/61; 219/160
[58] Field of Search .................. 219/74, 60 R, 61, 160

[56] References Cited

U.S. PATENT DOCUMENTS

| | | | |
|---|---|---|---|
| 2,866,074 | 12/1958 | Ronay | 219/74 |
| 3,450,857 | 6/1969 | Webb | 219/74 |
| 4,599,505 | 7/1986 | Lukens et al. | 219/74 |
| 4,839,489 | 6/1989 | Dyer | 219/74 |
| 4,866,236 | 9/1989 | DeNale et al. | 219/74 |
| 4,956,537 | 9/1990 | Schnorrer | 219/74 |
| 5,084,603 | 1/1992 | Bernuchon et al. | 219/74 |

FOREIGN PATENT DOCUMENTS

| | | | |
|---|---|---|---|
| 743809 | 7/1980 | U.S.S.R. | 219/74 |
| 1310145 | 5/1987 | U.S.S.R. | 219/74 |
| 1504030 | 8/1989 | U.S.S.R. | 219/74 |
| 1556838 | 4/1990 | U.S.S.R. | 219/74 |

*Primary Examiner*—Clifford C. Shaw
*Attorney, Agent, or Firm*—Bachman & LaPointe

[57] ABSTRACT

A chamber includes a plurality of chamber elements, forming a chamber having a bottom, sides, ends and an open top, and a support wire for flexibly linking the chamber elements. The chamber elements include a first set of U-shaped members having arm portions, an upper bottom portion and a lower bottom portion, an interior space being defined between the upper bottom portion and the lower bottom portion, the U-shaped members having perforations in the upper bottom portions, cutouts being formed in opposing edges of the arm portions; a second set of U-shaped members having arm portions and a bottom portion; and pins mounted between the arm portions of the second set of U-shaped members, members of the first set of U-shaped members and the second set of U-shaped members being alternatingly disposed, the cutouts of the first set of U-shaped members interacting with the pins of the second set of U-shaped members whereby members of the first set of U-shaped members can be pivoted relative to adjacent member of the second set of U-shaped members. Positioning structure is also disclosed to position the chamber in close proximity to a workpiece.

24 Claims, 6 Drawing Sheets

TIG SHIELDED ATMOSPHERE WELDING SYSTEM

BACKGROUND OF THE INVENTION

The invention relates to the field of Tungsten Inert Gas (TIG) welding and, more particularly, to a chamber for shielding the backside or root side of a weld during welding with inert gas to prevent oxidation of the weld.

DESCRIPTION OF THE RELATED ART

During welding operations, a frequently occuring problem is the oxidation of the weld and the materials to be welded while these materials are at an increased temperature and are, therefore, liable to oxidation. It is known to prevent such oxidation by performing the welding operations in inert atmospheres which prevent this oxidation. It is also known to supply inert gas to the reverse side, or root side, of the weld to prevent oxidation there as well.

For example, U.S. Pat. No. 4,956,537 discloses a "hindgas coverage" chamber which is affixed to the parts to be welded by means of vacuum chambers which hold the chamber to the parts to be welded by suction or vacuum. When flexibility is necessary, as with the welding of a pipe, this known system discloses the use of a laterally corrugated chamber which is intended to provide the required flexibility. This manner of obtaining a flexible chamber is also disclosed in U.S. Pat. No. 3,450,857, wherein a corrugated chamber can be adapted to conform to curved welding surfaces.

U.S. Pat. No. 4,866,236 discloses a flexible extendable backing shield which is said to have a chamber with flexible walls and a flexible bottom. No disclosure is made as to how this flexibility is obtained.

The aforementioned corrugated chambers are subjected to stresses and strains when flexed and therefore are subject to wear.

It is apparent, therefore, that there is a need for a flexible chamber which can be affordably manufactured and used for different applications to provide root side or back side shielding for a weld. It is also desirable that such a flexible chamber be flexible without being subjected to stresses and strains due to flexing.

It is thus the primary object of this invention to provide a flexible chamber which is simple in construction and which provides a gas shield at the root side of the weld.

It is another object of the invention to provide a flexible chamber for root side protection of the weld which is adjustable so as to be adaptable to use in welds of differing structure.

It is still another object of the present invention to provide a flexible chamber which is not subjected to stresses and strains and, therefore, excessive wear, when the chamber is flexed.

It is a further object of the present invention to provide a structure for maintaining the chamber at close proximity to the weld to ensure an adequate gas shield.

Further objects and advantages of the present invention will appear hereinbelow.

SUMMARY OF THE INVENTION

In accordance with the present invention, the foregoing objects and advantages are readily obtained.

The present invention is drawn to a flexible chamber which can be used to shield the root side of a weld on articles of various shape with an inert gas. The chamber comprises a plurality of chamber elements, forming a chamber having a bottom, sides, ends and an open top, and support means for flexibly linking the chamber elements whereby the chamber elements can pivot relative to one another.

The plurality of flexibly linked chamber elements preferably includes: a first set of U-shaped members having arm portions, an upper bottom portion, and a lower bottom portion, an interior space being defined between the upper bottom portion and the lower bottom portion, the U-shaped members having perforations in the upper bottom portions, cutouts being formed in opposing edges of the arm portions; a second set of U-shaped members having arm portions and a bottom portion; and pins mounted between the arm portions of the second set of U-shaped members, members of the first set of U-shaped members and the second set of U-shaped members being alternatingly disposed, the cutouts of the first set of U-shaped members interacting with the pins of the second set of U-shaped members, whereby members of the first set of U-shaped members can be pivoted relative to adjacent members of the second set of U-shaped members.

The support means, according to the invention, preferably comprises an elongated member which is preferably flexible, passing through the chamber elements; and means for adjusting tension in the elongated member, whereby the chamber elements are flexibly linked.

A system using the aforesaid chamber, according to the invention, preferably includes means for supplying shield gas to the chamber and means for positioning the chamber in close proximity to a portion of the workpiece to be welded.

BRIEF DESCRIPTION OF THE DRAWINGS

A detailed description of the preferred embodiments of the invention follows, with reference to the attached drawings, wherein.

DETAILED DESCRIPTION

Figure 1:
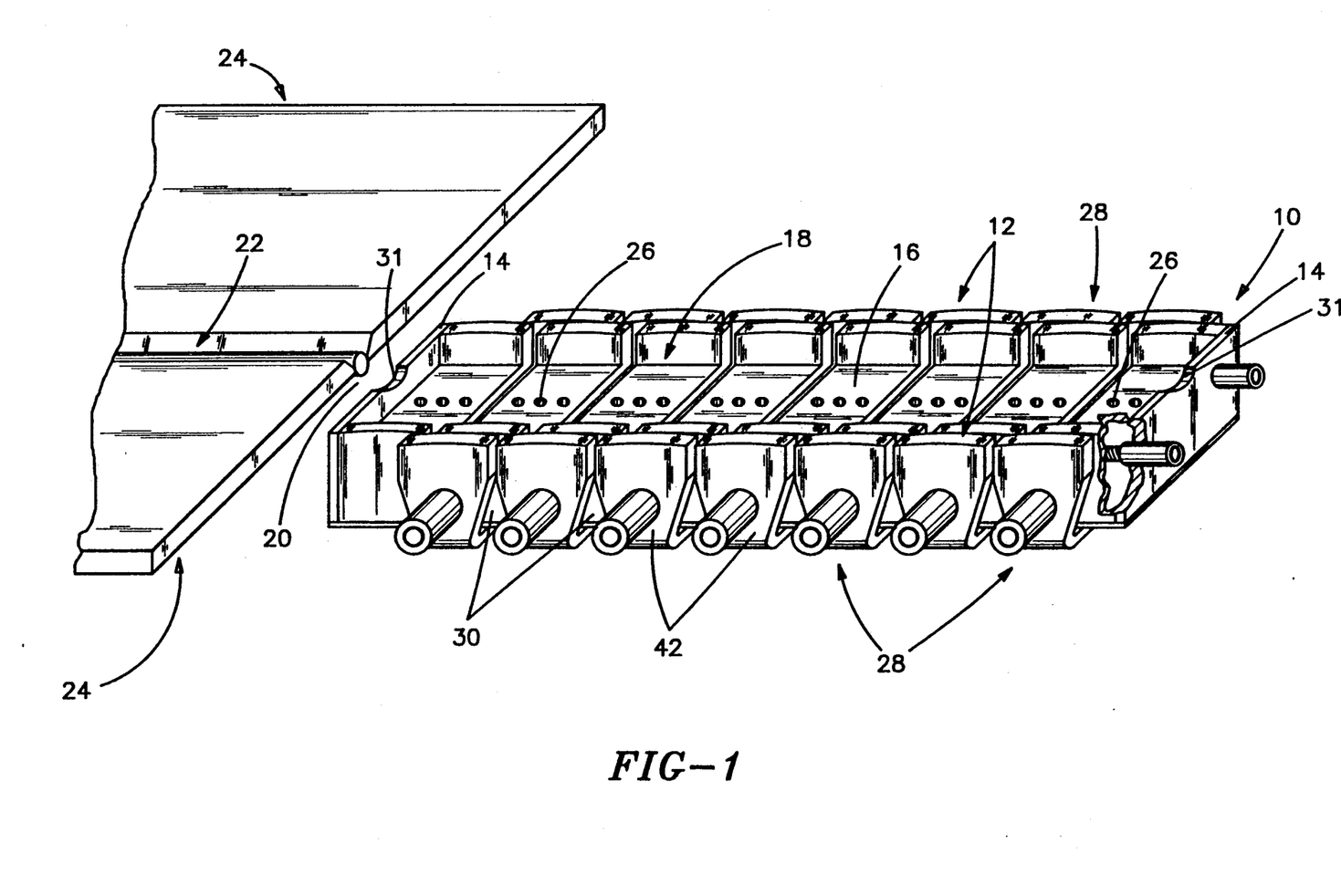
FIG. 1 is a perspective and partially cut away view of a preferred embodiment of the invention.

Referring now to the drawings, FIG. 1 illustrates a chamber 10, according to the invention. Chamber 10 is a flexible box shaped device having walls 12, ends 14, a bottom 16, and an open top 18. Chamber 10 is used to provide a shielding gas atmosphere, preferably along a back side or root side 20 of a weld 22 in a workpiece 24, to prevent oxidation and other undesireable occurrences to the weld 22 during a welding operation. Shielding gas is supplied to the chamber through perforations 26 disposed in bottom 16 of chamber 10. Chamber 10 is preferably moved along the weld 22 during the welding operation so that the gas shield is provided where it is most needed, at the root side of the point currently being welded.

Chamber 10 preferably comprises a plurality of flexibly linked chamber elements 28 which define the aforesaid walls 12, ends 14, bottom 16 and open top 18 of chamber 10.

While the workpiece 24 shown in FIG. 1 is flat, chamber 10 is made flexible so as to adapt to a variety of shapes of workpieces, and particularly to inner cylindrical surfaces such as the inside surface of a pipe. This flexibility is achieved, according to the invention, by a structure of chamber elements 28 as follows.

Figure 2:
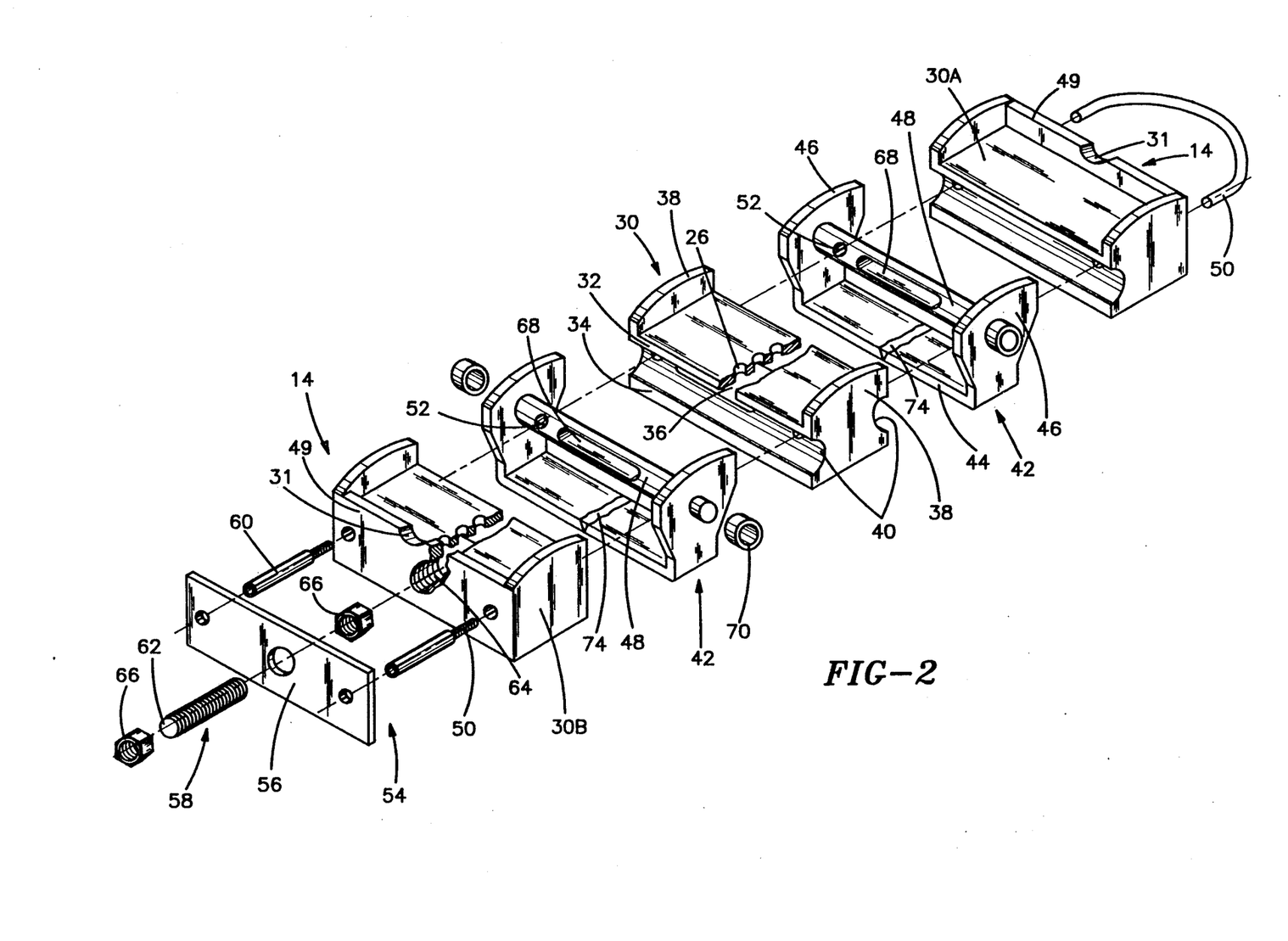
FIG. 2 is an exploded and partially cut away perspective view of a chamber according to a preferred embodiment of the invention.

FIG. 2 shows the various elements of a preferred embodiment of chamber 10. Chamber elements 28 preferably are substantially U-shaped in that they have arms and a bottom, and are also preferably provided in two types or sets. Members 30 of the first set of chamber elements have an upper bottom portion 32 and a lower bottom portion 34, defining an interior space 36 therebetween. Perforations 26 are preferably located in upper bottom portions 32 of at least some of the members 30 of the first set of chamber elements to allow gas flow from interior space 36 to a shielded space of chamber 10.

Members 30 of the first set of chamber elements also have arm portions 38, and have cutouts 40 formed in opposing edges of arm portions 38. Cutouts 40 facilitate flexible linkage of the chamber elements 28 as will be more fully described hereafter.

Members 42 of the second set of chamber elements are also generally U-shaped, and have a bottom portion 44 and arm portions 46. Members 42 of the second set are preferably dimensioned so as to overlap members 30 of the first set of chamber elements. Members 42 further include pins 48 mounted between arm portions 46.

Members 30 of the first set and members 42 of the second set are modularly assembled in an alternating fashion to form chamber 10. In this alternating configuration, arm portions 38,46 define walls 12 of chamber 10. Pins 48 of members 42 of the second set cooperate with cutouts 40 of members 30 of the first set so that adjacent chamber elements 28 can pivot relative to one another. This pivoting motion renders chamber 10 flexible and thus useful for welding operations conducted on workpieces or articles of various shapes.

Two chamber elements 28, preferably two members 30 of the first set of chamber elements, are modified to include an end wall 49. These two modified members 30A, 30B (FIG. 2) are disposed at either end of chamber 10 to provide the ends 14 thereof. Modified members 30A, 30B preferably have cutouts 31 along a top surface of end wall 49 to facilitate passage of chamber 10 over a weld bead.

Chamber 10 also preferably includes support means for flexibly linking chamber elements whereby the chamber elements can pivot relative to one another.

FIG. 2 shows a preferred embodiment of the support means, which includes an elongated member, which may preferably be a flexible wire 50, which is disposed through guide holes 52 of pins 48. Wire 50 is secured at both ends 14 of chamber 10, preferably in modified members 30A, 30B. Wire 50 secures chamber elements 28 together in a fashion which allows pivot of adjacent chamber elements 28 relative to one another. Naturally, the elongated member could be any structure which flexibly holds the chamber elements 28 together, such as a number of flexible pins, a number of wires, or any other structure known in the art to provide a suitable flexible linking. The chamber so formed is therefore flexible and can be adapted to workpieces of various diverse shape.

Support means may preferably include tension adjusting means 54 including an end plate 56 adjustably disposed through thread means 58 to an end wall 49 of modified member 30B. Wire 50 is attached to end plate 56. In this configuration, manipulation of thread means 58 displaces end plate 56 relative to end wall 14 of chamber element 30B, thus adjusting the tension in wire 50. This tension adjusting means is useful for tightening wire 50 which may stretch during conditions of use.

As shown in FIG. 2, wire 50 may preferably be doubled around one modified end 30A and be fixed at both ends in the other modified end 30B. This disposition adds stability to operation of chamber 10 and simplifies connection of wire 50 to one end of chamber 10.

Wire 50 may preferably be mounted to end plate 56 through sleeves 60 which serve to immobilize and protect wire 50 at its connection with tension adjusting means 54.

Thread means 58 preferably comprises a threaded member 62 disposed in a threaded channel 64 of one modified member 30B and being rotatably fixed to end plate 56, for example, through lugs 66.

Pins 48 preferably have channels 68 located therein which align with interior spaces 36 of members 30 of the first set of chamber elements. Channels 68 cooperate with adjacent interior spaces 36 to form a continuous inner passage in chamber 10. These channels 68 or passages communicate interior spaces 36.

Pins 48 may preferably be mounted between arm portions 46 through rivets 70 which are connected to pins 48 through holes 72 located in arm portions 46. To facilitate this assembly, members 42 of the second set of chamber elements may be welded together at a central seam 74 located, for example, in bottom portion 44 of members 42. This welded seam 74 provides resilience to members 42 which allows proper insertion and disposition of pins 48.

Figure 3:
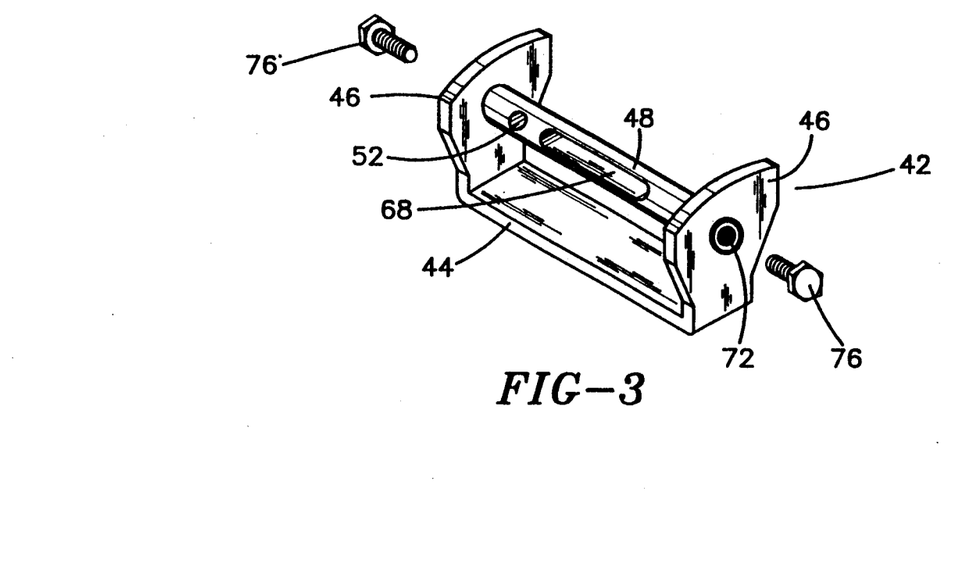
FIG. 3 is a perspective and partially exploded view of an alternate embodiment of the invention.

Referring to FIG. 3, an alternate connection of pin 48 to member 42 of the second set of chamber elements is shown. According to this embodiment, pins 48 are held in place by screws 76 which are inserted into pins 48 through apertures 72 located in arms 46 of chamber element 42. In this embodiment, no rivets or welded central seams are required.

Figure 4:
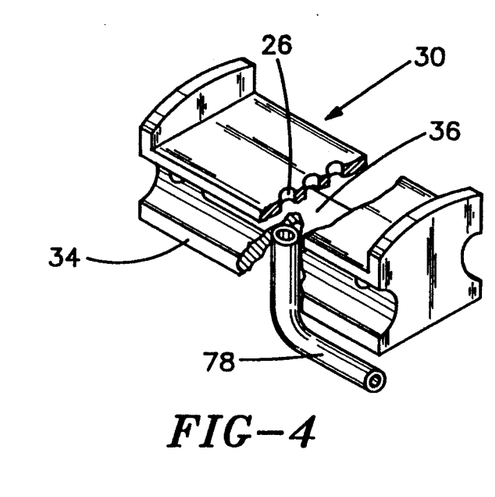
FIG. 4 is a perspective and partially cut away view of an alternate embodiment of the invention.
Figure 5:
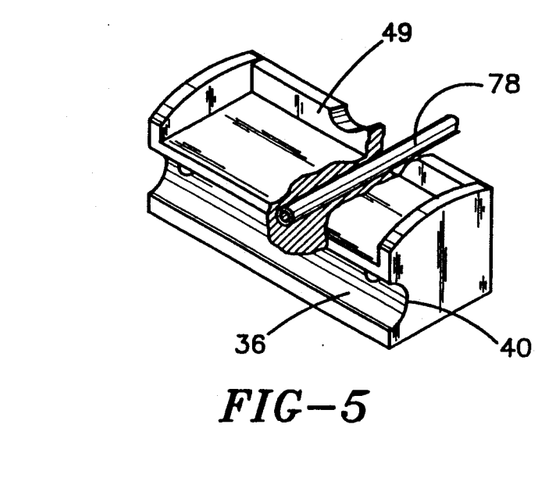
FIG. 5 is a perspective and partially cut away view of an alternate embodiment of the invention.

As previously mentioned, shield gas is supplied to the chamber to provide the desired shielding atmosphere. Referring to FIGS. 4 and 5, two embodiments of means for supplying shield gas will be illustrated.

FIG. 4 illustrates an embodiment wherein shield gas is introduced into interior space 36 through a conduit 78 passing through lower bottom portion 34 of a member 30 of the first set of chamber elements. Shield gas so introduced travels through channels 68 of adjacent pins 48 and thence through perforations 26 to provide the desired shielding atmosphere. The gas concentration, and of course the gas shielding, tend to drop with increased distance from conduit 78. Thus, a plurality of conduits 78 may be used to introduce shield gas at several points of the chamber. Naturally, a conduit 78 should be disposed at a point in chamber 10 corresponding to the actual point of welding so that effective shielding can be obtained where it is most needed.

FIG. 5 illustrates an alternate location for conduit 78. In this embodiment, conduit 78 is introduced into interior space 36 through an end wall 49 of a modified member. In the embodiment of FIG. 5, shield gas is introduced into channel 68 of pin 48 of an adjacent member 46 (not shown) and thence to adjacent member 30 of the first set of chamber elements. This embodiment would be useful, for example, where chamber 10 is to move along a weld 22 with one end 14 leading and corresponding in location to the point of most recent welding. In this situation, an end mounted conduit 78 introduces shield gas where it is most needed.

Obviously, a combination of conduits 78 and locations thereof could be used to provide the most effective shielding in a desired welding operation.

Figures 6, 7:
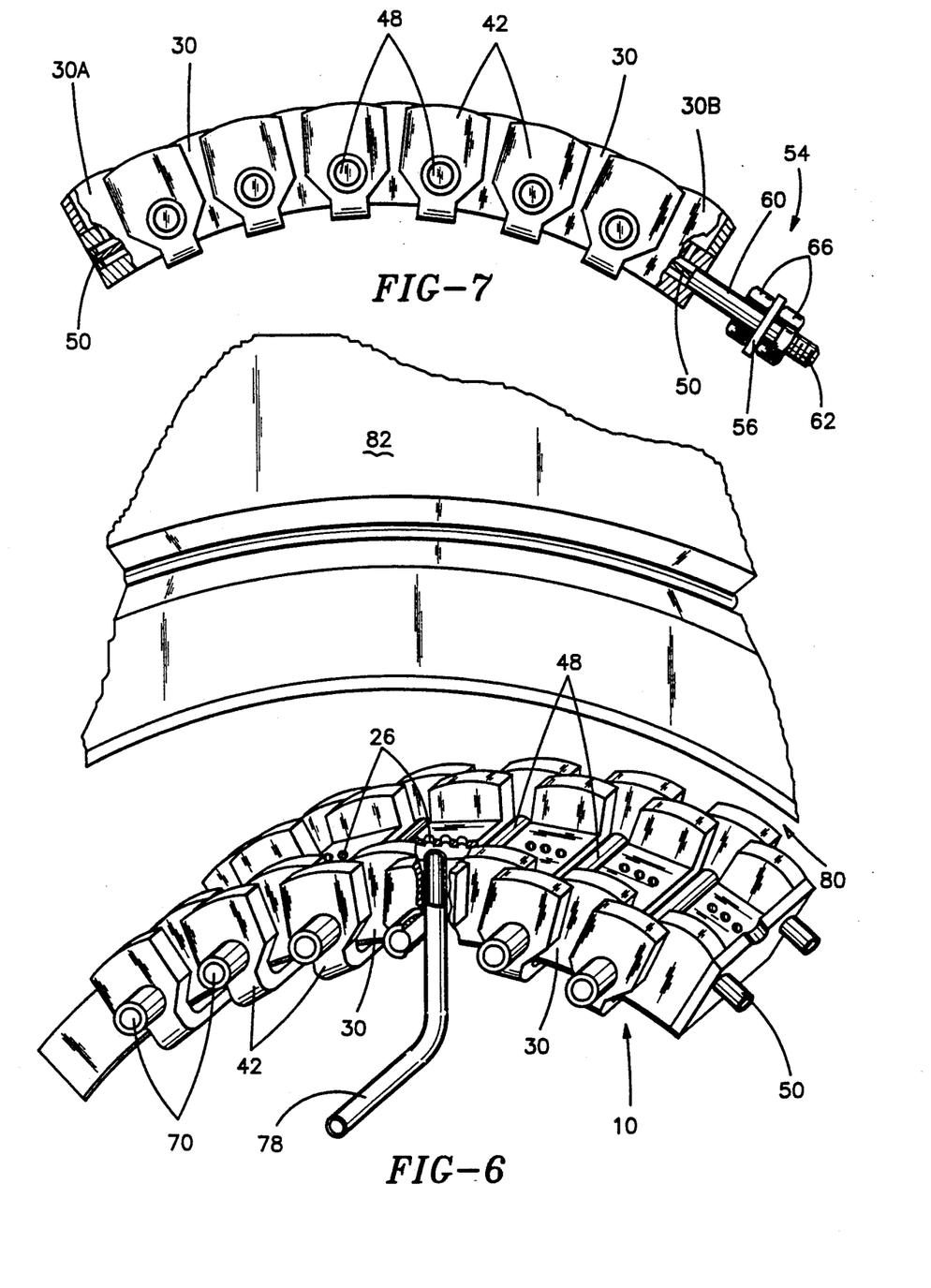
FIG. 6 is a perspective view of a preferred embodiment of the invention.
FIG. 7 is a side elevational view, partially cut away, of a preferred embodiment of the invention.

FIG. 6 illustrates a chamber 10, according to the invention, disposed for use on an inside surface 80 of a curved workpiece 82. In this configuration, chamber elements 30, 42 are pivoted relative to one another, around pins 48, to adapt the chamber 10 to the surface of the workpiece 82.

It should be noted that the location of holes 52 in pins 48 could be altered to modify the effect of tension in wire 50 upon chamber 10. If wire 50 is passed through pins 48 above the center thereof, tension in wire 50 will more noticeably urge chamber 10 towards a straight disposition. Passing wire 50 through pins 48 below the center thereof would, upon tensioning of wire 50, urge chamber 10 towards a curved or flexed disposition. Thus, the location of holes 52 could be selected so as to produce a desired flexation tendency of chamber 10.

FIG. 7 is a partially cutaway side elevational view which further illustrates a preferred configuration of wire 50 and modified chamber members 30A, B, as well as the structure of tension adjusting means 54.

In use, chamber 10 is disposed adjacent to the workpiece, preferably at the root side of the weld, so that shield gas supplied to chamber 10 prevents oxidation and generally protects the weld. It has been found that chamber 10 does not need to be sealingly disposed against the workpiece, but rather must only be close enough to the workpiece so that leakage of gas out of chamber 10 does not require a prohibitive amount of shield gas to be supplied to chamber 10. Thus, according to the invention, means for positioning a chamber relative to the workpiece are also disclosed.

The preferred embodiments of positioning means to accomplish the foregoing are described as follows.

Figure 8:
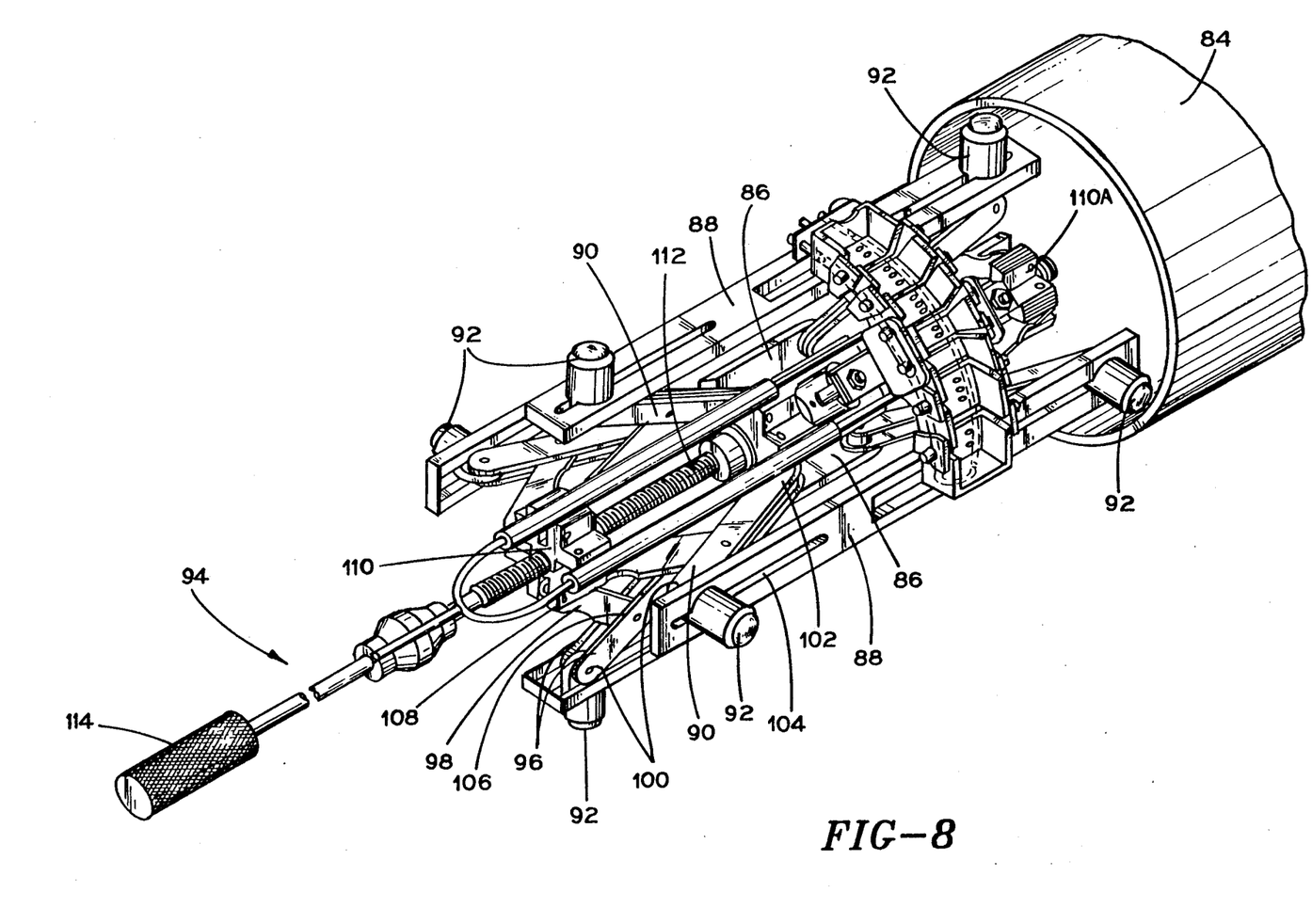
FIG. 8 is a perspective view of a preferred embodiment of the invention.

FIG. 8 illustrates a positioning means for use in shielding a weld from the inside of a tubular workpiece 84.

According to this embodiment, the positioning means includes a base 86 and a plurality of bars 88 mounted to base 86 through a plurality of levers 90. Chamber 10 is preferably mounted to one or more of the bars 88. Contact members 92 are disposed along bars 88. Contact members 92 are preferably positioned about a circumference defined by bars 88.

Levers 90 are preferably displaced by lever actuating means 94 to provide radial displacement of bars 88 relative to base 86.

Levers 90 may preferably by mounted in crossed pairs, each consisting of a first lever 96 and a second lever 98. First lever 96 of each pair has a first end 100 and a second end 102. First end 100 is preferably slidably mounted to a respective bar 88. This slidable mounting is accomplished, for example, by disposing first end 100 in a track 104 passing through bar 88. Second end 102 of first lever 96 is preferably pivotally mounted to base 86 through any means known in the art. Contact members 92 may preferably be disposed on first ends 100 of respective first levers 96. Second lever 98 of each pair has a first end 106 and a second end 108. First end 106 of second lever 98 may preferably be pivotally mounted to first lever 96 of the pair. This pivotal mounting may preferably be at a center portion of first lever 96. Second end 108 is preferably pivotally mounted to a guide base 110. Guide base 110 is preferably threadedly mounted on a threaded bar 112 which is rotatably mounted in a longitudinally fixed manner in base 86. Rotation of threaded bar 112 in base 86 causes longitudinal displacement of guide base 110, resulting in displacement of levers 90 and radial repositioning of contact members 92. Rotation may be imparted to threaded bar 112 through a handle 114 or any other means known in the art. As shown in FIG. 8, a plurality of guide bases 110 may be used to facilitate stability in operation of the system. To allow desired operation, additional guide base 110a may be mounted to threaded bar 112 through a reverse thread.

Contact members 92 may preferably comprise any structure which would allow the necessary degree of motion when disposed against an inside wall of tubular workpiece 84.

Figure 9:
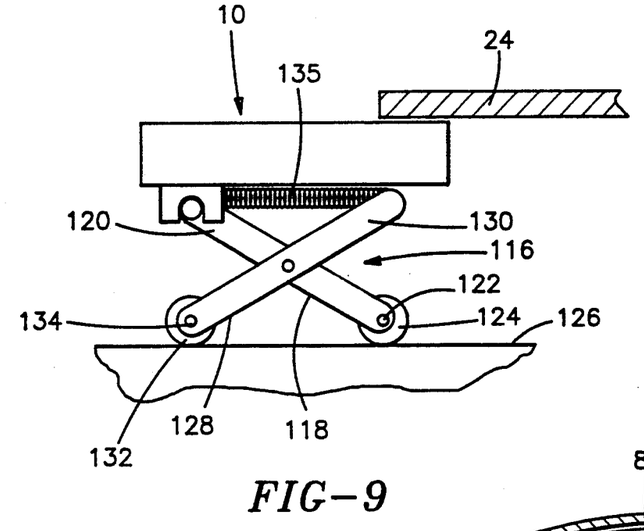
FIG. 9 is a side view, partially in section, of an alternate embodiment of the invention.

FIG. 9 illustrates a simple positioning means which may be used with a variety of shapes of workpieces. Chamber 10 is schematically shown disposed against a flat workpiece 24 by a pair of crossed levers 116. A first lever 118 of the pair has a first end 120 pivotally mounted to the bottom of chamber 10 and a second end 122 having rolling means 124 for interacting with a ground surface 126 of the work area. A second lever 128 has a first end 130 disposed against the bottom of chamber 10 and a second end 134 having rolling means 132 interacting with the ground surface 126 of the work area. Biasing means 135 are preferably disposed between first end 120 of first lever 118 and first end 130 of second lever 128 to bias chamber 10 toward workpiece 24. Biasing means 135 may preferably comprise, for example, a spring as shown in FIG. 9 or a hydraulic cylinder, or any other desired means for biasing levers 116 to dispose chamber 10 against workpiece 24.

Figure 10:
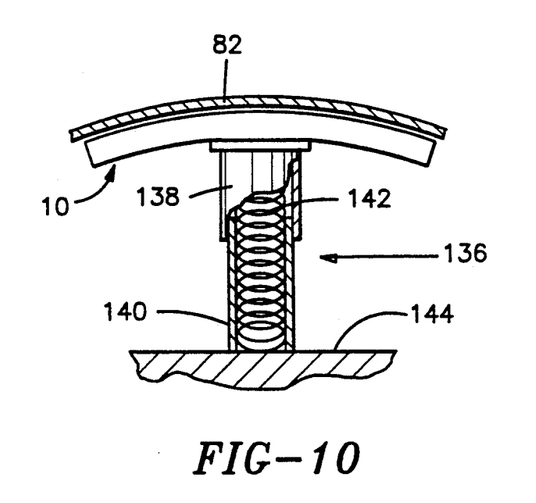
FIG. 10 is a side view, partially in section, of an alternate embodiment of the invention.

FIG. 10 illustrates a further alternate embodiment of positioning means, wherein a chamber 10 is schematically shown disposed against a curved workpiece 82 by a pair of biased concentric tubes 136. A first tube 138 is preferably slidably disposed over a second tube 140, and biasing means 142 may preferably be contained therein to urge chamber 10 towards workpiece 82 as desired. First tube 138 may preferably support chamber 10 while second tube 140 is attached to support surface 144 which may be ground level or, for example, a carriage (not shown) to which the tubes 136 and chamber 10 are mounted.

Figure 11:
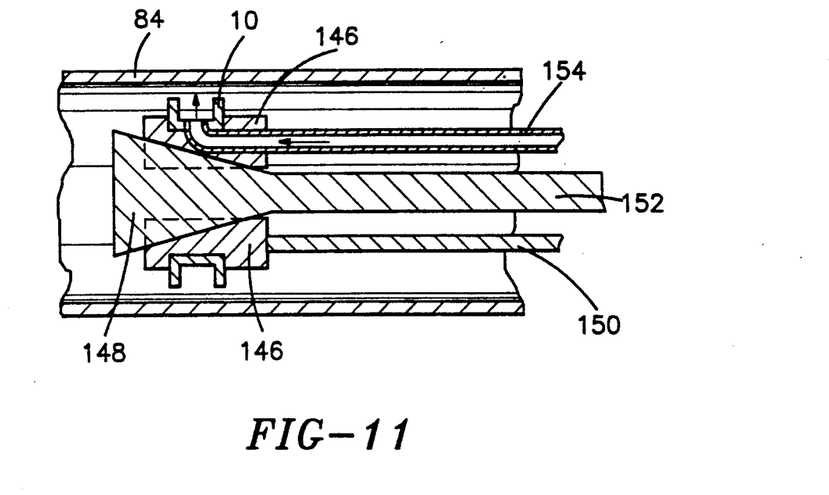
FIG. 11 is a cross section of an alternate embodiment of the invention.

FIG. 11 illustrates a still further alternate embodiment of the positioning means, wherein a chamber 10 is shown, in section, mounted to a positioning means including a base 146 slidably disposed over a wedge 148, inside a tubular workpiece 84. Sliding motion or displacement of base 146 relative to wedge 148 causes radial positioning of chamber 10 relative to workpiece 84. Sliding motion of base 146 relative to wedge 148 may be accomplished through any means known in the art, such means being schematically depicted in FIG. 11 as bars 150, 152. Shield gas is supplied to chamber 10 through, for example, gas conduit 154.

In the embodiment of FIG. 11, shielding over a 360° inside diameter of the tube may be accomplished through the use, as shown, of a double sided wedge 148 with an additional base 146 mounted thereon.

It should be noted that the various above described embodiments of positioning means could be adapted to various orientations of chamber to workpiece. For example, a base/wedge structure as shown in FIG. 11 could be used to position a chamber 10 lengthwise relative to a flat workpiece as shown in FIG. 9.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A system for providing a gas shielded atmosphere for welding operations, comprising:
   a chamber having a bottom, sides, and ends defining a shielded space having an open top, the chamber having an inner passage and perforations located in the bottom of the chamber to allow flow from the inner passage to the shielded space;
   means for supplying shield gas to the inner passage of the chamber; and
   means for positioning the open top of the shielded space of the chamber in close proximity to a portion of a workpiece being welded.

2. A system according to claim 1, wherein the workpiece is a tubular article having an inside surface, the positioning means comprising:
   a central base;
   a plurality of bars mounted to the base through lever members, the chamber being mounted on at least one of the plurality of bars;
   a plurality of contact bearings mounted to the bars; and
   means for actuating the lever members, whereby the contact bearings can be disposed for slidable contact with the inside surface of the tubular article.

3. A system according to claim 2, wherein the levers are mounted in crossed pairs, a first lever of each pair having a first end and a second end, the first end of the first lever being slidably mounted to a respective bar of the plurality of bars, the second end of the first lever being mounted to the central base, the contact bearings being mounted to the first end of the first lever, a second lever of each pair having a first end and a second end, the first end of the second lever being pivotally mounted to the first lever, the second end of the second lever being fixedly connected to a guide base, the guide base being mounted on a threaded rod which is rotatably mounted in a longitudinally fixed manner in the central base, so that the guide base is movable longitudinally relative to the central base, whereby radial position of the contact bearings can be adjusted through rotation of the threaded rod.

4. A system according to claim 1, wherein the positioning means comprises:
   at least one pair of crossed levers upon which the chamber is mounted, and means for biasing the levers, whereby the chamber can be maintained in close proximity to the workpiece.

5. A system according to claim 1, wherein the positioning means comprises at least one pair of concentric tubes upon which the chamber is mounted, and means for biasing the tubes, whereby the chamber can be maintained in close proximity to the workpiece.

6. A system according to claim 1, wherein the workpiece is an inside surface of a tubular article, the positioning means comprising a base to which the chamber is mounted and a wedge upon which the base is slidably disposed, whereby displacement of the base along the wedge positions the chamber relative to the inside surface of the tubular article.

7. A system according to claim 1, wherein the chamber comprises:
   a plurality of flexibly linked chamber elements defining the bottom, sides, ends, shielded space and inner passage of the chamber; and
   support means for flexibly linking chamber elements whereby the chamber elements can pivot relative to one another.

8. A system according to claim 7, wherein the plurality of flexibly linked chamber elements includes:
   a first set of U-shaped members having arm portions, an upper bottom portion and a lower bottom portion, an interior space being defined between the upper bottom portion and the lower bottom portion, the perforations being formed in the upper bottom portions, cutouts being formed in opposing edges of the arm portions;
   a second set of U-shaped members having arm portions and a bottom portion; and
   pins mounted between the arm portion of the second set of U-shaped members, members of the first set of U-shaped members and the second set of U-shaped members being alternatingly disposed, the cutouts of the first set of U-shaped member interacting with the pins of the second set of U-shaped members whereby members of the first set of U-shaped members can be pivoted relative to adjacent members of the second set of U-shaped members, the interior space of members of the first set of U-shaped members forming the inner passage.

9. A system according to claim 8, wherein the support means comprises an elongated member passing through the chamber elements; and
   means for adjusting tension in the elongated member, whereby the chamber elements ar flexibly linked.

10. A system according to claim 8, wherein the pins have channels located therein and aligned with interior spaces of members of the first set of U-shaped members, whereby the inner passage is a continuous inner passage.

11. A system according to claim 7, wherein the support means comprises an elongated member passing through the chamber elements; and
   means for adjusting tension in the elongated member, whereby the chamber elements are flexibly linked.

12. A method for shielding a workpiece to be welded, comprising the steps of:
   positioning a flexible chamber in close proximity to a portion of the workpiece being welded, the flexible chamber comprising a plurality of chamber elements forming a chamber having a bottom, sides, and end defining a shielded space having an open top, the chamber having an inner passage and perforations located in the bottom of the chamber to allow flow from the inner passage to the shielded space, and support means for flexibly linking the chamber elements;

supplying shielded gas to the chamber; and maintaining the chamber in close proximity over the portion of the workpiece being welded.

13. A chamber for providing a gas shield, comprising:

a plurality of chamber elements, forming a chamber having a bottom, sides, and ends defining a shielded space having an open top, the chamber having an inner passage and perforations located in the bottom of the chamber to allow flow from the inner passage to the shielded space; and support means for flexibly linking the chamber elements, whereby the chamber elements can pivot relative to one another.

14. A chamber according to claim 13, wherein the support means comprises an elongated member passing through the chamber elements; and means for adjusting tension in the elongated member, whereby the chamber elements are flexibly linked.

15. A chamber according to claim 14 wherein the tension adjusting means comprises a plate displaceably attached to one end of the chamber, the elongated member being attached to the plate so that displacement of the plate adjusts tension in the elongated member.

16. A chamber according to claim 13, wherein the plurality of flexibly linked chamber elements includes:

a first set of U-shaped members having arm portions, an upper bottom portion and a lower bottom portion, an interior spaced being defined between the upper bottom portion and the lower bottom portion, the perforations being formed in the upper bottom portions, cutouts being formed in opposing edges of the arm portions;

a second set of U-shaped members having arm portions and a bottom portion; and pins mounted between the arm portions of the second set of U-shaped members, members of the first set of U-shaped and the second set of U-shaped members being alternatingly disposed, the cutouts of the first set of U-shaped members interacting with the pins of the second set of U-shaped members whereby members of the first set of U-shaped members can be pivoted relative to adjacent member of the second set of U-shaped members, the interior space of members of the first set of U-shaped members forming the inner passage.

17. A chamber according to claim 16, wherein the plurality of chamber elements further include two end members, each having an end wall forming the ends of the chamber.

18. A chamber according to claim 17 wherein the pins have guide holes through which the elongated member passes.

19. A chamber according to claim 18, wherein the pins are mounted between the arm portions of members of the second set of U-shaped members by rivets.

20. A chamber according to claim 18, wherein the pins are mounted between the arm portions of members of the second set of U-shaped members by screw means threaded into ends of the pins through apertures in the arm portions of members of the second set of U-shaped members.

21. A chamber according to claim 16, wherein the tensioning means comprises an elongated member passing through the chamber elements; and means for adjusting tension in the elongated member, whereby the chamber elements are flexibly linked.

22. A chamber according to claim 16, wherein the pins have channels located therein and aligned with interior spaces of members of the first set of U-shaped members, whereby the inner passage is a continuous inner passage.

23. A system for providing a gas shielded atmosphere for welding operations, wherein the workpiece is a tubular article having an inside surface, the system comprising:

a chamber having a bottom, sides, ends and an open top;

means for supplying shield gas to the chamber; and means for positioning the open top of the chamber in close proximity to a portion of the workpiece being welded, the positioning means comprising a central base, a plurality of bars mounted to the central base through levers, the chamber being mounted on at least one of the plurality of bars, a plurality of contact bearings being mounted tot he bars, wherein the levers are mounted in crossed pairs, a first lever of each pair having a first end and a second end, the first end of the first lever being slidably mounted to a respective bar of the plurality of bars, the second end of the first lever being mounted to the central base, the contact bearings being mounted tot he first end of the first lever, a second lever of each pair having a first end and a second end, the first end of the second lever being pivotally mounted to the first lever, the second end of the second layer being fixedly connected to a guide base, and means for actuating the lever members, whereby the contact bearings can be disposed for slidable contact with the inside surface of the tubular article, the actuating means including a threaded rod rotatably mounted in a longitudinally fixed manner in the central base, the guide base being threadedly mounted to the threaded rod, whereby radial position of the contact bearings can be adjusted through rotation of the threaded rod.

24. A system for providing a gas shielded atmosphere for welding operations, wherein the workpiece is a tubular article having an inside surface, the system comprising:

a chamber having a bottom, sides, ends and an open top;

means for supplying shield gas to the chamber; and means for positioning the open top of the chamber in close proximity to the workpiece, comprising a base to which the chamber is mounted and a wedge upon which the base is slidably disposed, whereby displacement of the base along the wedge positions the chamber relative to the inside surface of the tubular article.

* * * * *

UNITED STATES PATENT AND TRADEMARK OFFICE
CERTIFICATE OF CORRECTION

PATENT NO. : 5,256,847
DATED : October 26, 1993
INVENTOR(S) : MIGUEL A. ALEMAN R.

It is certified that error appears in the above-indentified patent and that said Letters Patent is hereby corrected as shown below:

Claim 8, column 8, line 38 "portion" should be --portions--.

Claim 9, column 8, line 53 "ar" should be --are--.

Claim 12, column 9, line 2 "end" should be --ends--.

Claim 12, column 9, line 8 "shielded" should be --shield--.

Claim 23, column 10, line 29 "tot he" should be --to the--.

Claim 23, column 10, line 36 "tot he" should be --to the--.

Signed and Sealed this

Seventeenth Day of May, 1994

Attest:

BRUCE LEHMAN

Attesting Officer

Commissioner of Patents and Trademarks